United States Patent
Hicks et al.

(10) Patent No.: US 8,966,617 B2
(45) Date of Patent: Feb. 24, 2015

(54) IMAGE PATTERN UNLOCKING TECHNIQUES FOR TOUCH SENSITIVE DEVICES

(71) Applicant: barnesandnoble.com llc, New York, NY (US)

(72) Inventors: Kourtny M. Hicks, Sunnyvale, CA (US); Gerald B. Cueto, San Jose, CA (US); Amir Mesguich Havilio, Palo Alto, CA (US)

(73) Assignee: barnesandnoble.com llc, New York, NY (US)

( * ) Notice: Subject to any disclaimer, the term of this patent is extended or adjusted under 35 U.S.C. 154(b) by 30 days.

(21) Appl. No.: 13/868,483

(22) Filed: Apr. 23, 2013

(65) Prior Publication Data

US 2014/0317723 A1  Oct. 23, 2014

(51) Int. Cl.
*G06F 21/31* (2013.01)
*G06F 21/36* (2013.01)

(52) U.S. Cl.
CPC ................................ *G06F 21/36* (2013.01)
USPC ........................................................ 726/19

(58) Field of Classification Search
CPC ....................................................... H04L 9/32
USPC ............................................................ 726/19
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |

(Continued)

FOREIGN PATENT DOCUMENTS

EP  0722150 A1  7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Teshome Hailu
*Assistant Examiner* — Thanh Le
(74) *Attorney, Agent, or Firm* — Finch & Maloney PLLC

(57) ABSTRACT

Techniques are disclosed for providing an image pattern unlock mode in electronic touch sensitive devices. The image pattern unlock mode can display an unlock screen to the user, prompting the user to arrange or create or otherwise select a specific image pattern in order to unlock the device. The customizable image pattern may include any uniquely identifiable unlocking pattern including a combination of images, or even a single image selected from an image group. The unlocking mechanism may include images gathered from the user's photo collection and/or one or more online profiles, and the unlock pattern could be a selection of such images. In other embodiments, a combination of color and images can also be used, such as matching colors to images. When the user has arranged the proper image pattern, the device unlocks and may be used. If the correct image pattern is not arranged, the device remains locked.

20 Claims, 13 Drawing Sheets

(56) References Cited

U.S. PATENT DOCUMENTS

| | | | |
|---|---|---|---|
| RE42,738 E | 9/2011 | Williams | |
| 8,059,101 B2 | 11/2011 | Westerman et al. | |
| 8,196,198 B1* | 6/2012 | Eger | 726/21 |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2007/0047002 A1 | 3/2007 | Hull et al. | |
| 2008/0036747 A1 | 2/2008 | Hope | |
| 2009/0241072 A1* | 9/2009 | Chaudhri et al. | 715/863 |
| 2009/0288150 A1* | 11/2009 | Toomim et al. | 726/5 |
| 2010/0100854 A1 | 4/2010 | Russell et al. | |
| 2010/0180336 A1* | 7/2010 | Jones et al. | 726/19 |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0258542 A1 | 10/2011 | Kenney et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0269024 A1 | 10/2013 | Chiu et al. | |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, KIRUPA.COM, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do Wacom tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," Brando—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8th, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset,"Brando—mobile.brando.com, http://mobile.brando.com/prod_detail.php? prod_id=03291, 4 pages, printed from the Internet on May 10, 2013.

(56) References Cited

OTHER PUBLICATIONS

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.

Kanai, et al., "Intra-Rendition Navigation," Copyright 2012-2013 International Digital Publishing Forum (IDPF), 13 pages.

"explaining how the sPen tech works (and is very diff than other styluses)," http://forum.xda-developers.com/showthread_php?t=, 1 page, printed from the Internet on Jan. 15, 2013.

Non Final Office Action Issued for U.S. Appl. No. 13/868,495. Mail date: Sep. 11, 2014. 19 pages.

* cited by examiner

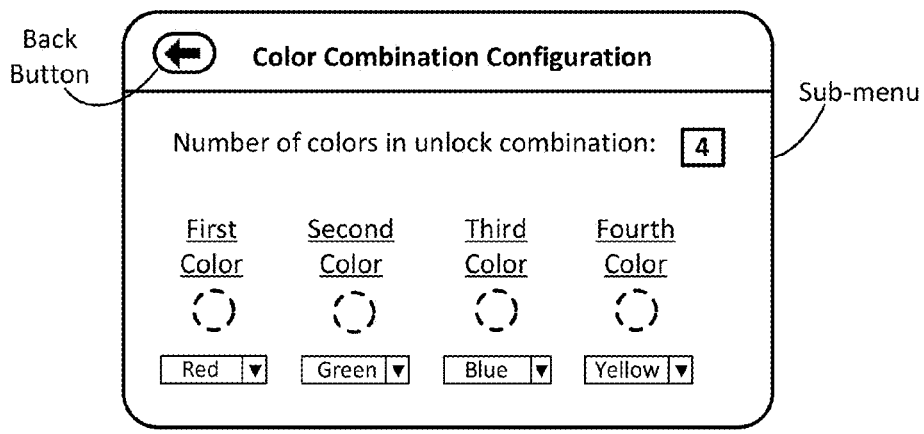
Fig. 1e
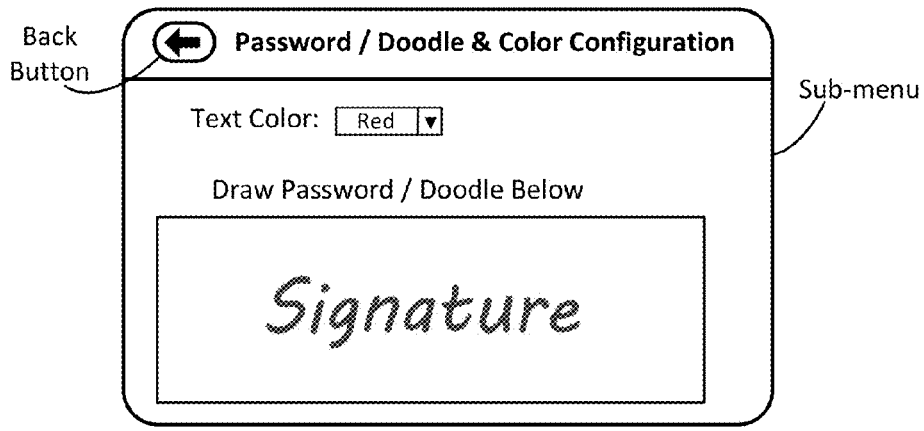
Fig. 1e'
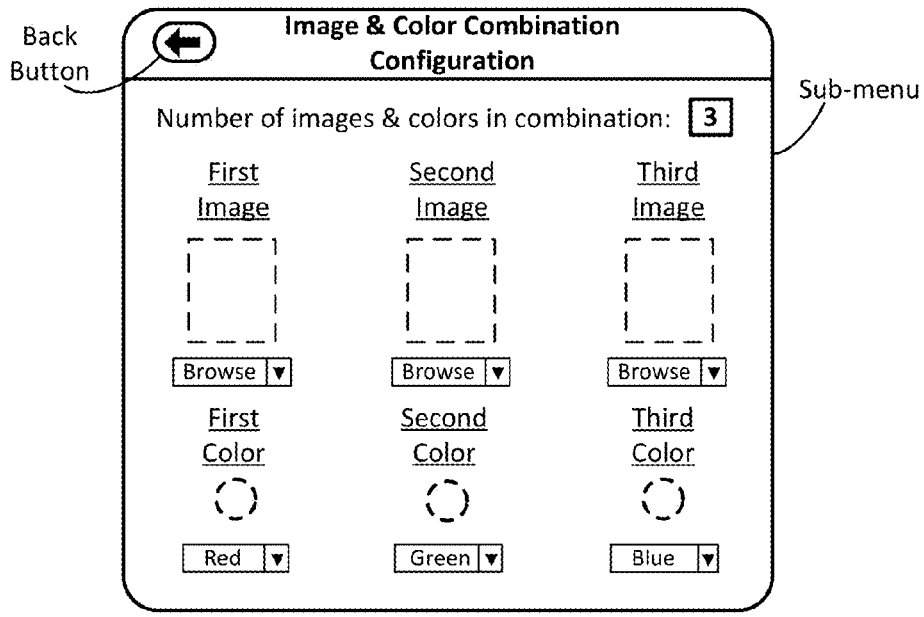
Fig. 1e"

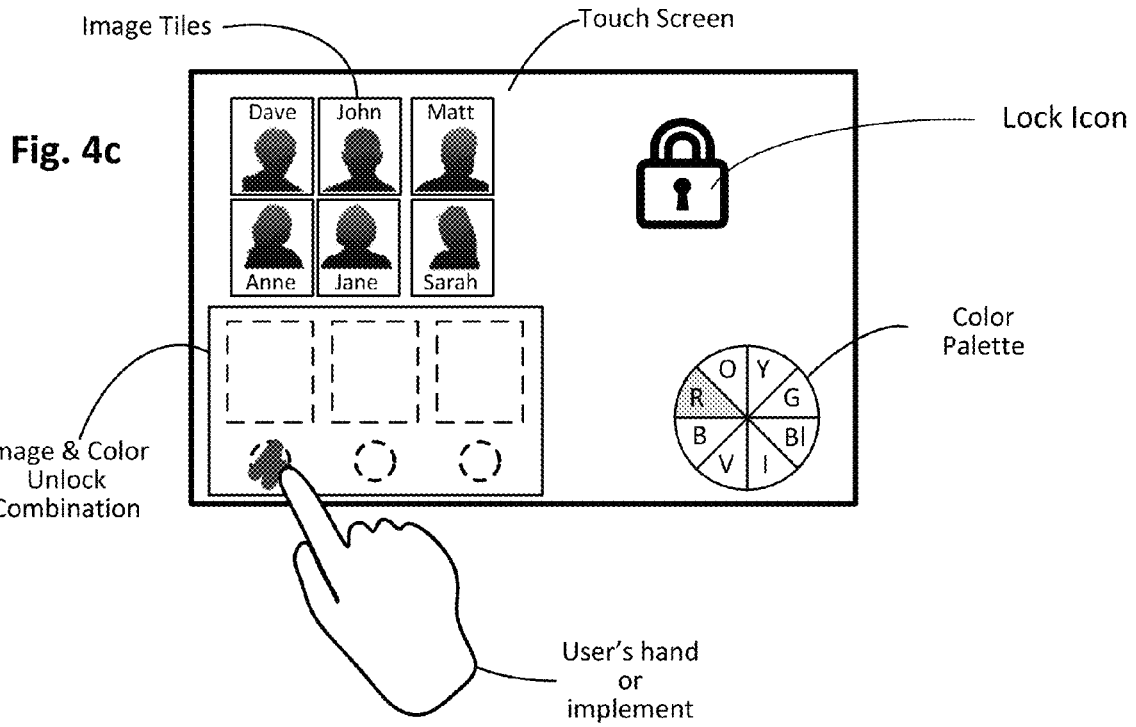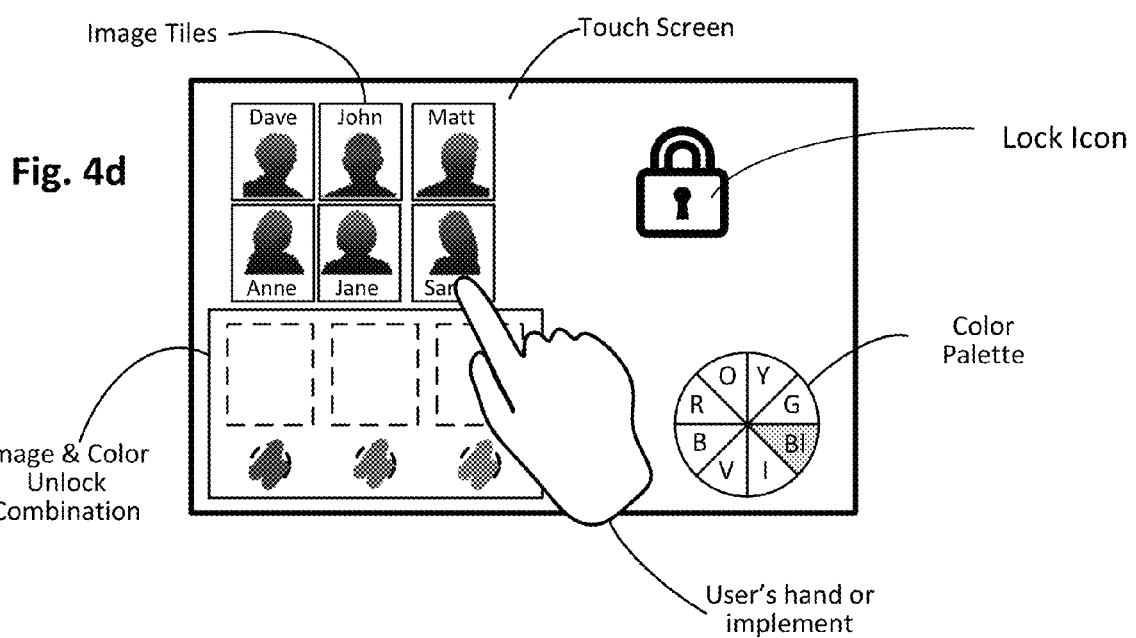

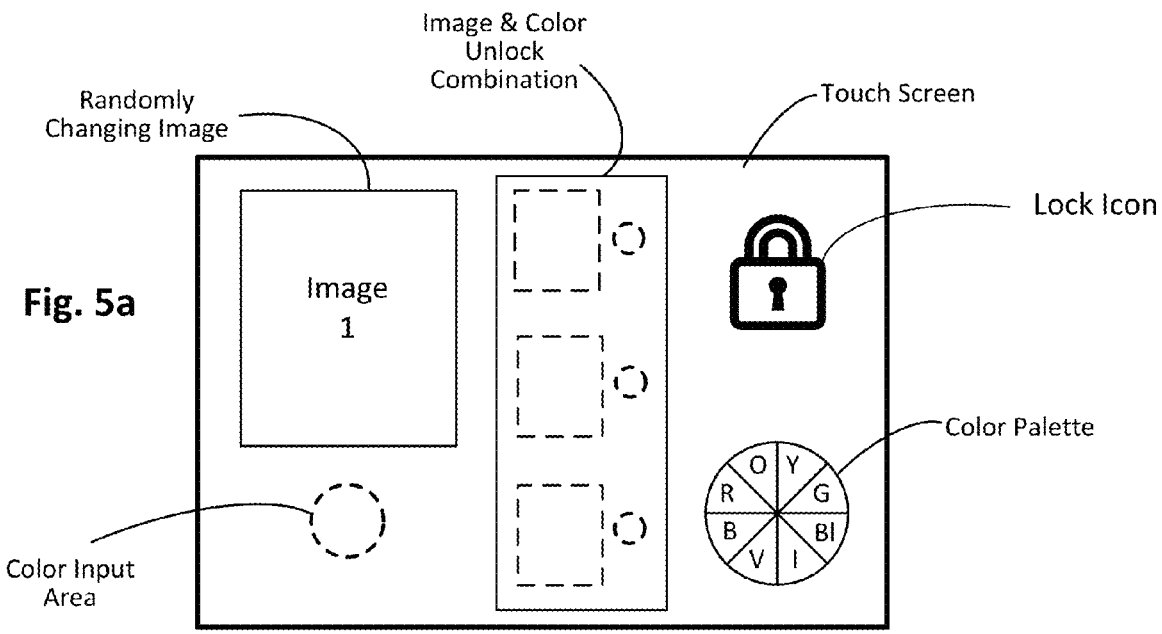
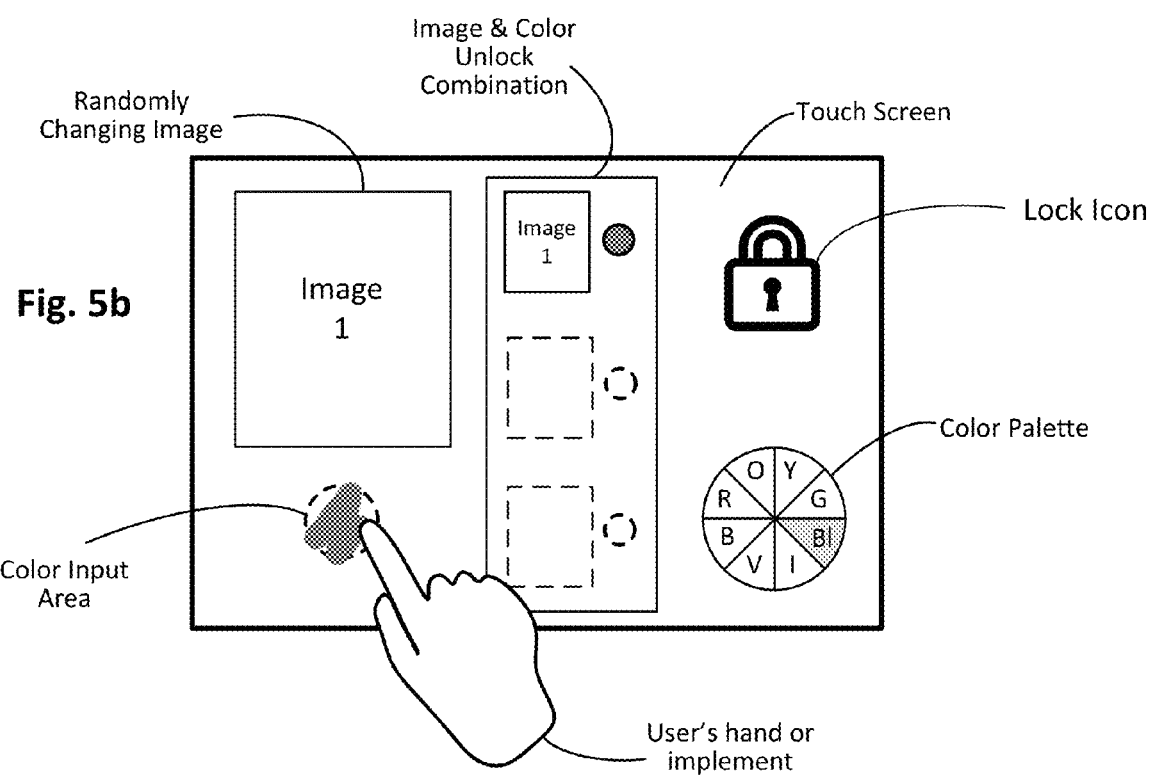

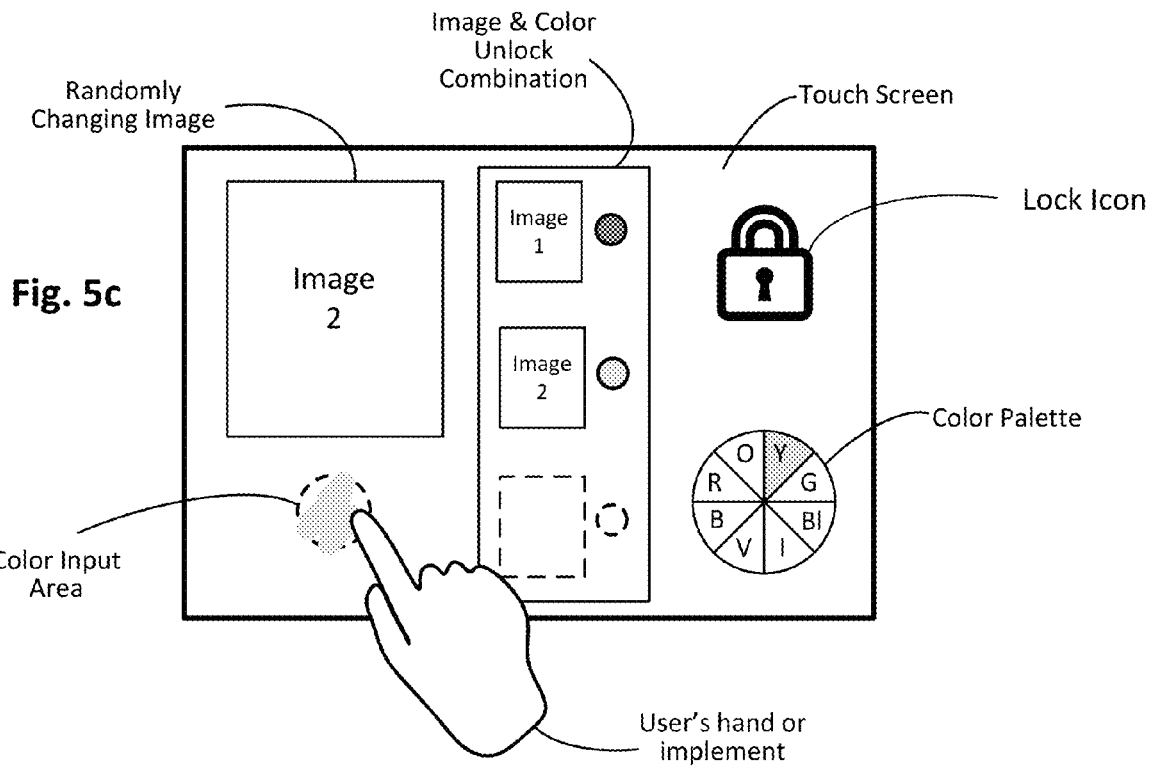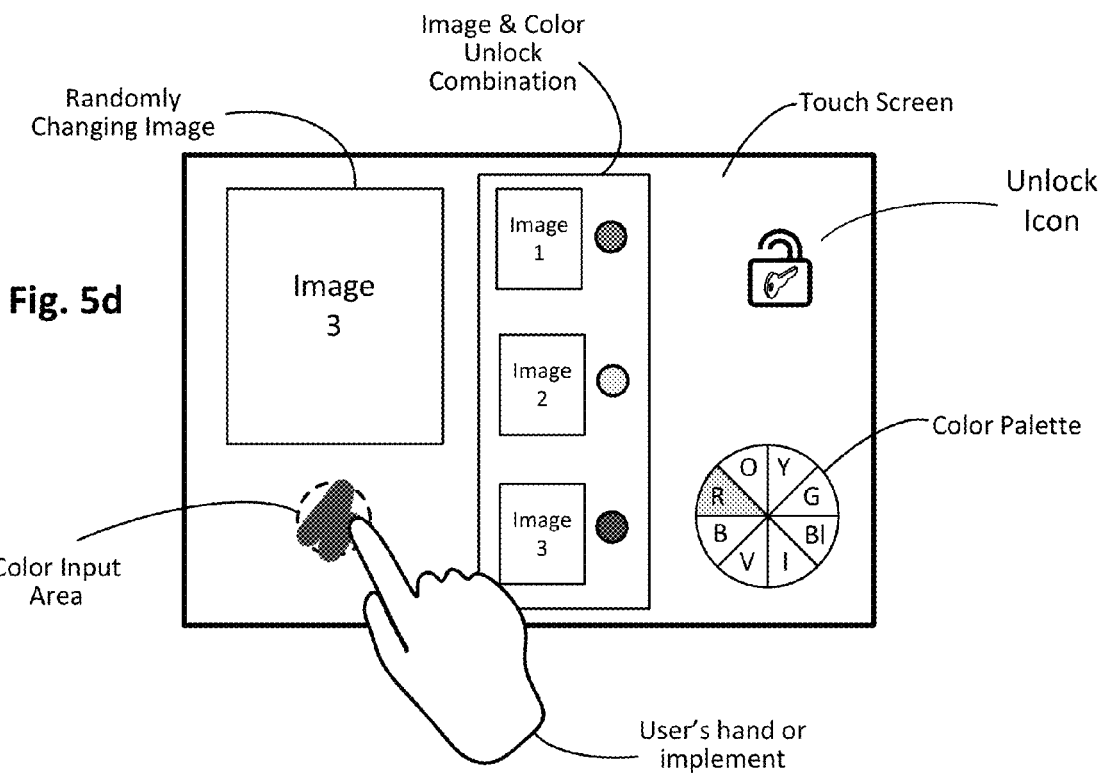

IMAGE PATTERN UNLOCKING TECHNIQUES FOR TOUCH SENSITIVE DEVICES

RELATED APPLICATIONS

This application is related to U.S. application Ser. No. 13/868,495 filed Apr. 23, 2013 and titled "Color Pattern Unlocking Techniques for Touch Sensitive Devices" which is herein incorporated by reference in its entirety.

FIELD OF THE DISCLOSURE

This disclosure relates to electronic display devices, and more particularly, to user interface (UI) techniques for interacting with touch screen devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/ or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

BRIEF DESCRIPTION OF THE DRAWINGS

FIGS. 1c-e" illustrate example configuration screen shots of the user interface of the electronic touch screen device shown in FIGS. 1a-b, configured in accordance with an embodiment of the present invention.

FIGS. 4a-g illustrate an example image pattern unlock mode of an electronic touch screen device, in accordance with an embodiment of the present invention.

FIGS. 5a-d illustrate an example image pattern unlock mode of an electronic touch screen device, in accordance with another embodiment of the present invention.

DETAILED DESCRIPTION

Figure 1A:
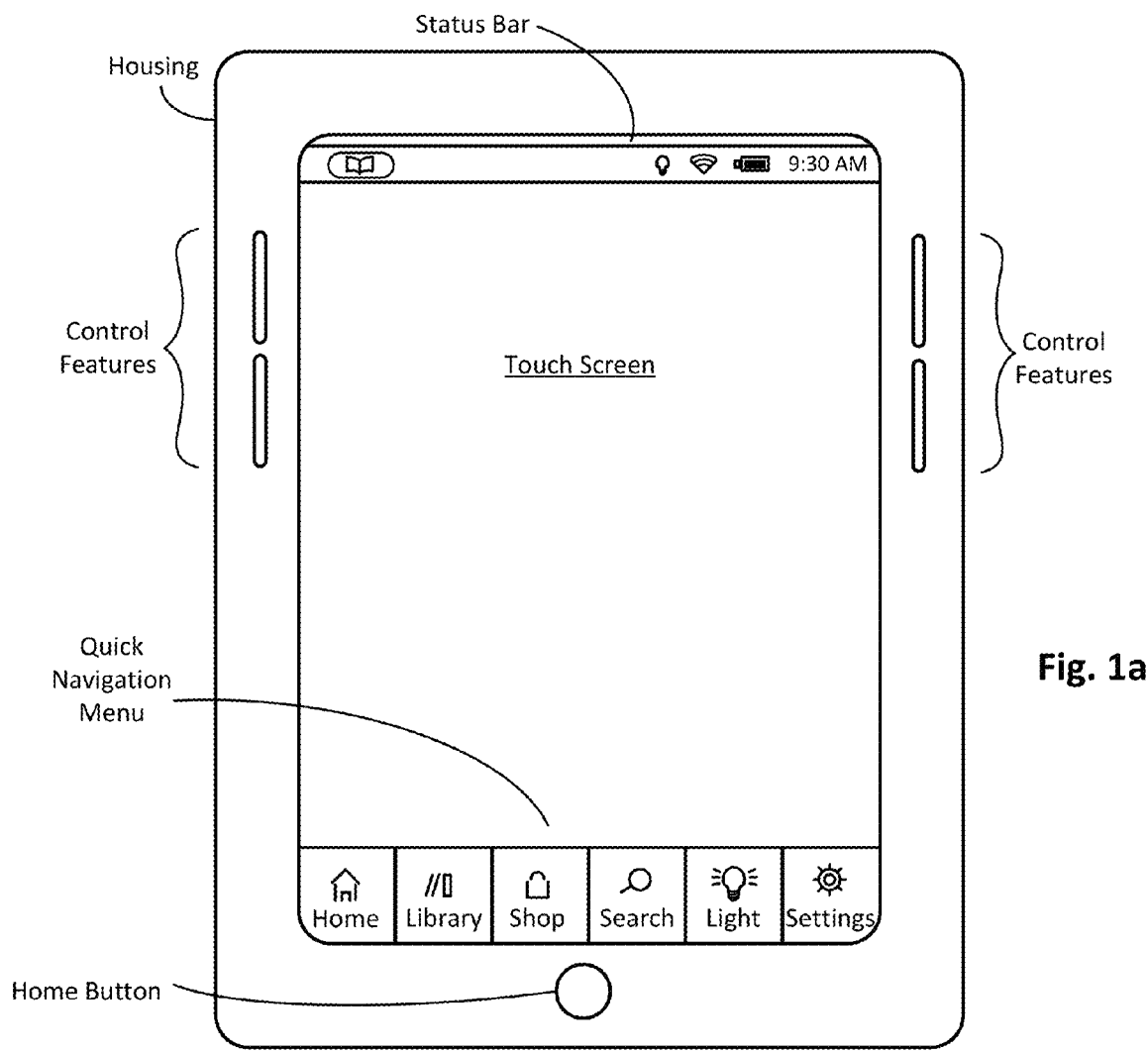
FIGS. 1a-b illustrate an example electronic touch screen device having an image pattern unlock mode configured in accordance with an embodiment of the present invention.

Techniques are disclosed for providing an unlock mode in electronic touch sensitive devices. In some embodiments, the unlock mode can display an unlock screen to the user, prompting the user to arrange or create or otherwise select a specific image pattern in order to unlock the device. The desired image pattern that will unlock the device may be configured by the user. The customizable image pattern may include any uniquely identifiable unlocking pattern including a single image or a combination of images. In some embodiments, the unlocking mechanism may include personalized images gathered from the user's photo collection and/or one or more social media profiles associated with the user (e.g., online services that employ user avatars or photos associated with each account) that the user of the locked device can recognize, and the unlock pattern could be a selection of such images. In other embodiments, a combination of color and images can also be used, such as matching colors to images. If a correct color-image pattern is arranged, the device is unlocked. Example color patterns include a combination of colors arranged in a certain order, a combination of colors combined with a password, a combination of colors combined with one or more words written out in one or more colors, or a combination of colors each matched with a specific image.

General Overview

As previously explained, electronic display devices such as tablets, eReaders, and smart phones are commonly used for displaying user interfaces and consumable content. The user of such devices can typically consume the displayed content with relative ease. In some instances, the user may wish to lock the device while it is not being used. While available device locking techniques are commonly provided with touch screen devices for such purposes, an image pattern unlock mode as described herein may provide a secure and more intuitive computing device unlock technique, or otherwise enhance the user experience.

Thus, and in accordance with an embodiment of the present invention, image pattern unlocking techniques are disclosed for use in electronic touch screen devices. In some embodiments, after an electronic device has been locked, placed into sleep or power-saving mode, or restarted, the user must first unlock the device before it can be used again. Such a locking function provides security, helping to prevent unauthorized use of the device. By implementing the image pattern unlocking techniques described herein, the user may further personalize the unlocking function.

In one specific example, when a device is locked the device may display an unlock screen whenever a user indicates a desire to begin using the device. In some embodiments, an image pattern unlock screen may include various UI features including, for example, a number of image tiles that the user may select or drag into a certain order, a color palette for selecting a desired color, a number of color input areas where the user can paint or otherwise input a color pattern, and/or a drawing or inking input area for detecting words or images drawn on the touch screen device. Other image pattern unlocking features will be apparent in light of this disclosure, and some embodiments may include some or all of the features described above. In some embodiments, the user may interact with these various UI features using a finger, an active or passive stylus, or any other suitable implement. In one example embodiment, in order to unlock the device the user must create the appropriate image pattern on the unlock screen. Example image patterns can include a single image selected from a plurality of images, a single image selected based on a randomly displayed color or other randomly displayed trigger previously associated with the single image (the trigger color or other randomly displayed trigger item effectively acts as a hint as to which image must be selected, as previously established by the user), a combination of images arranged in a certain order, a combination of images arranged in a certain order each matched with a specific color, a combination of images arranged in a certain order combined with one or more words hand-written in one or more colors, in some embodiments. Some embodiments may further include a traditional password entry field. More generally, the image pattern unlock mode may be configured to unlock the device in response to any uniquely identifiable unlocking pattern including a configurable combination of images. In other embodiments, the unlocking mechanism may include images gathered from the user's photo collection and/or one or more social media profiles accessible to the user (e.g., online services that employ user avatars or photos associated with each account) that the user of the locked device can recognize. In such embodiments, the unlock pattern could be a selection of one or more such images and the user could personalize the unlocking mechanism by configuring the image pattern as previously explained.

Architecture

Figure 1B:
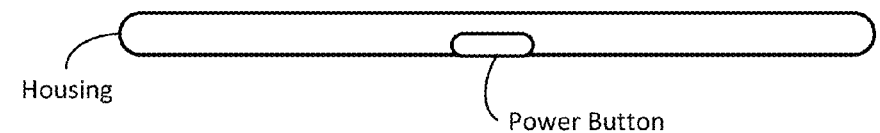

FIGS. 1a-b illustrate an example electronic touch sensitive device having an image pattern unlock mode configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated, the claimed invention is not intended to be limited to any specific kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
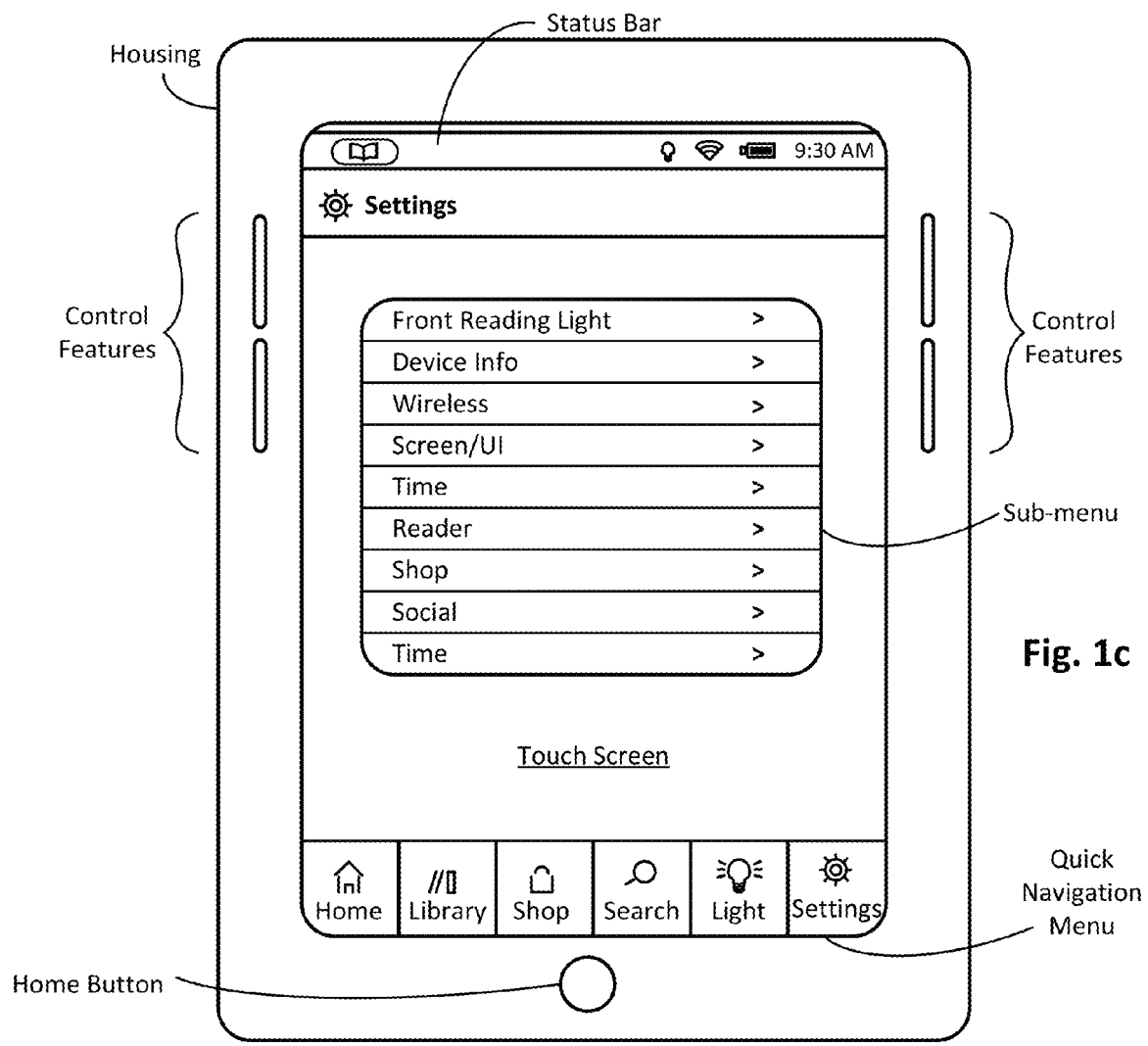
Figure 1D:
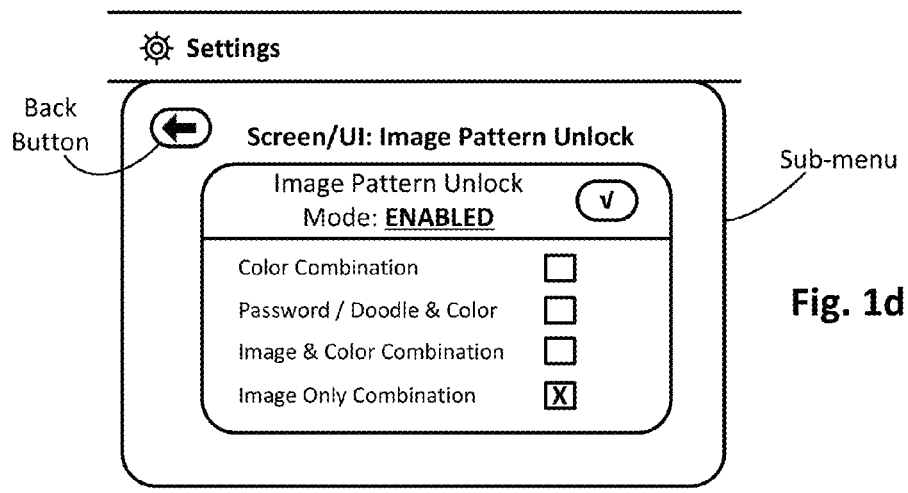

In one particular embodiment, an image pattern unlock mode configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu item may cause the configuration sub-menu of FIG. 1d to be displayed, in accordance with an embodiment. In other example embodiments, selecting the Screen/UI option may present the user with a number of additional sub-options, one of which may include a so-called "Image Pattern Unlock" option, which may then be selected by the user so as to cause the image pattern unlock mode configuration sub-menu of FIG. 1d to be displayed. Any number of such menu schemes and nested hierarchies can be used, as will be appreciated in light of this disclosure. In other embodiments, the image pattern unlock function is hard-coded such that no configuration sub-menus are needed or otherwise provided (e.g., unlocking the device with a determined image pattern combination as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, etc.). In some instances, note that the user need not actually physically touch the touch sensitive device to perform an action. For example, the touch screen display may be configured to detect input based on a finger or stylus hovering over the touch sensitive surface (e.g., within 3 inches of the touch screen). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the image pattern unlock mode configuration sub-menu shown in FIG. 1d can be provided to the user. The user can configure a number of functions with respect to the image pattern unlock mode, in this example embodiment. For instance, in this example case, the configuration sub-menu includes a UI check box that when checked or otherwise selected by the user, effectively enables the image pattern unlock mode (shown in the enabled state); unchecking the box disables the mode. Other embodiments may have the image pattern unlock mode always enabled, or enabled by a physical switch or button located on the device, for example. In some embodiments, the user may configure a number of options with respect to the image pattern unlock mode. In this particular example, the user may enable a color combination feature by selecting a UI check box associated with the color combination mode. In one such example, if the color combination feature is enabled, the unlock function may require the user to create a certain color combination in addition to the regular unlocking gesture or password. As shown in FIG. 1e, the color combination feature may be customized with a color combination configuration sub-menu. In such a sub-menu, the user may customize the number of colors in the unlock combination, along with the color sequence, using various drop down menus or other UI selection techniques.

With further reference to the example embodiment of FIG. 1d, the image pattern unlock mode may be associated with a password or doodle that must be written in a specific color or combination of colors. In some embodiments, a doodle may include a pre-defined shape, like a circle, triangle, or square. In such an example, the password/doodle & color option may be selected in the image pattern unlock mode configuration sub-menu using a UI check box. In this particular example, this check box is not selected. If selected, a password/doodle & color option may be customized using a sub-menu such as the one shown in FIG. 1e'. In the example shown in FIG. 1e', the user may select a text color and draw the word, words, or doodle that will be used as the unlock code for the device. In this example, the user must write the word "signature" on the device in the color red in order to unlock the device. In some embodiments, the password may include more than one word each in a different color, while in other embodiments the password may include a single word with each character written in a specific color.

With further reference to the example embodiment of FIG. 1d, the image pattern unlock mode may be associated with an image and color combination in some embodiments. The image and color combination option may be enabled by selecting a UI check box. In this particular example, the UI check box is not selected. In some embodiments, the image and color combination option may be customized using a separate sub-menu such as the one shown in FIG. 1e". The user may specify the number of images and matching colors in the combination, may select the various images using a drop down menu or browse function, as shown in this example, and may select the colors that will be associated with each image in the combination. In this particular example, in order to complete the image and color combination and unlock the device, the user must match the first image with the color red, the second image with the color green, and the third image with the color blue.

With further reference to the example embodiment of FIG. 1d, the unlocking mechanism may be associated with an image only unlocking combination in some embodiments. The images may be images gathered from the user's photo collection and/or one or more social media profiles associated with or otherwise accessible to the user (e.g., online services that employ user avatars or photos associated with each account) that the user of the locked device can recognize. Utilizing personal photos may provide a more intuitive user experience with respect to the unlocking mechanism. In one particular example, the images may be images of Facebook® friends, or photos in which both the user and one of the user's friends are tagged, or profile pics or avatars associated with online accounts (such as the profile pics of contacts of the user). In such an embodiment, in order to unlock the device the user must arrange particular images into a pre-configured pattern. In this particular example, the UI check box is selected. The image only combination feature may be configured by the user to define which pattern of images will unlock the device. In one embodiment, the image only combination feature may be configured in a separate configuration sub-menu like the one shown in FIG. 1e''', but without the color select portion.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menus shown in FIGS. 1d-1e''' are presented merely as examples of how an image pattern unlock mode may be configured by the user, and numerous other configurable or hard-codable aspects will be apparent in light of this disclosure.

Figure 2A:
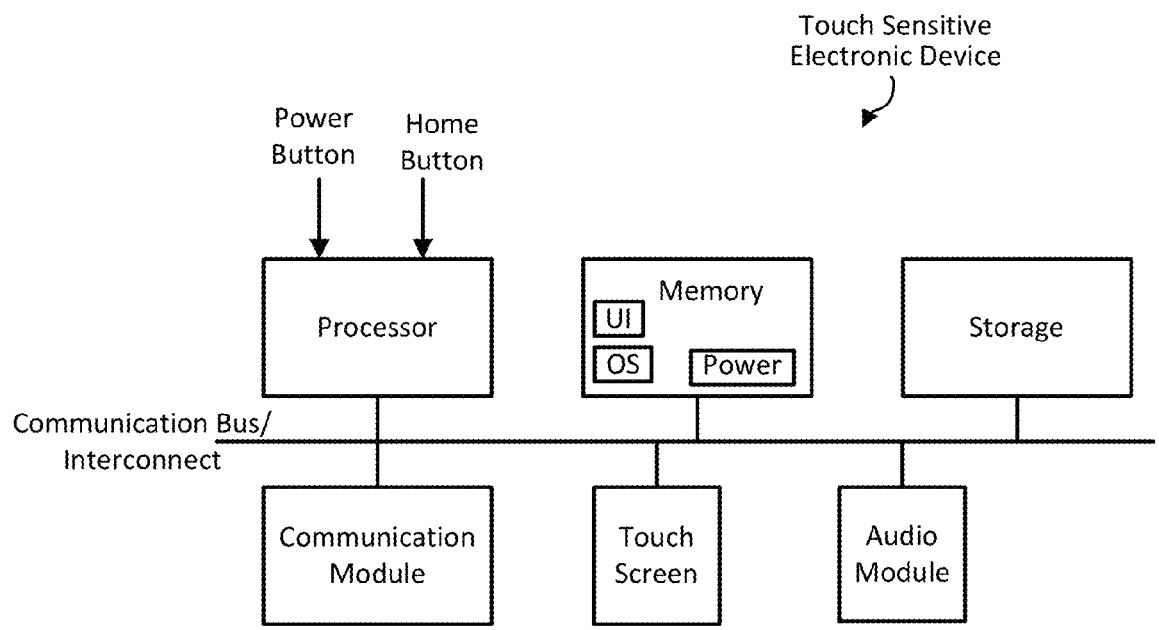
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having an image pattern unlock mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touchscreen, or any other suitable display and touchscreen interface technology. The communications module can be, for instance, any suitable 802.11b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots and use-case scenarios shown in FIGS. 1a, 1c-e", 3a-e, 4a-g, and 5a-d, and in conjunction with the image pattern unlock mode methodologies demonstrated in FIG. 6, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
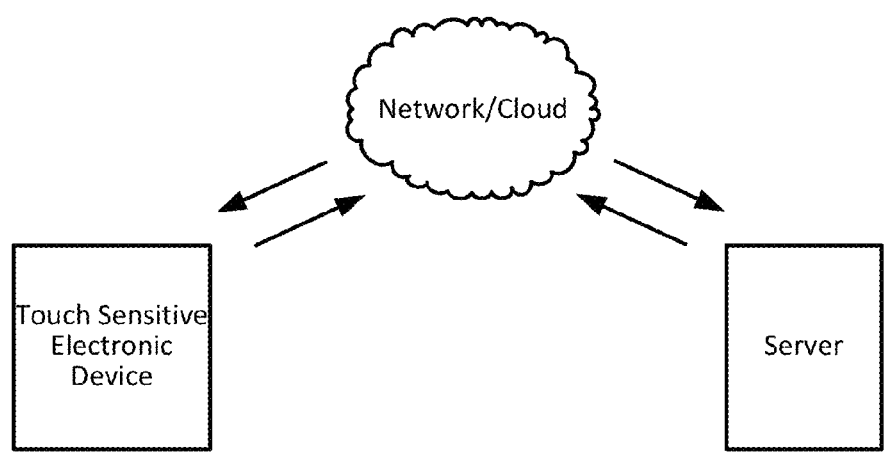
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision an image pattern unlock mode as provided herein to the touch screen device (e.g., via JavaScript or other browser based technology). In other embodiments, portions of the image pattern unlock methodology are executed on the server and other portions of the methodology are executed on the device. Numerous server-side/client-side execution schemes can be implemented to facilitate an image pattern unlock mode in accordance with an embodiment, as will be apparent in light of this disclosure.

Image Pattern Unlock Mode Examples

Figure 3A:
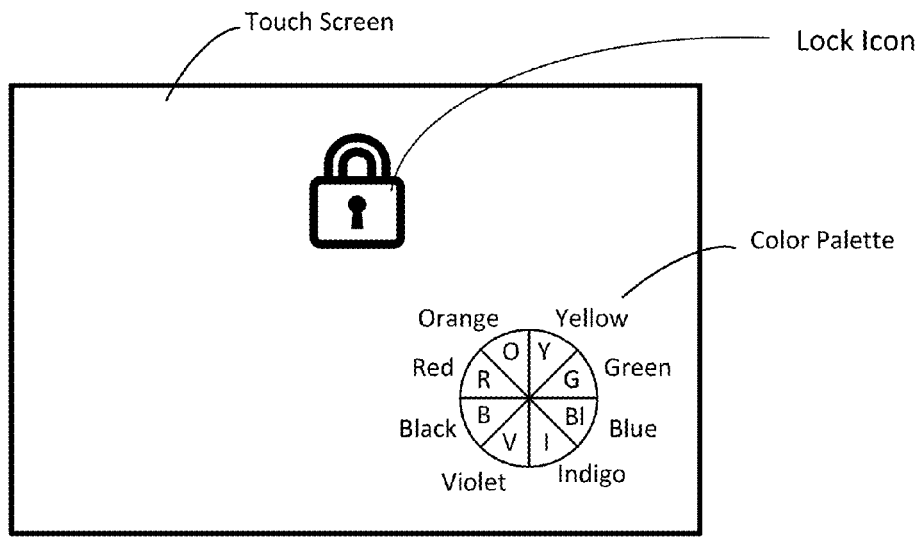
FIGS. 3a-e illustrate an example color pattern unlock mode of an electronic touch screen device, in accordance with an embodiment of the present invention.
Figure 3B:
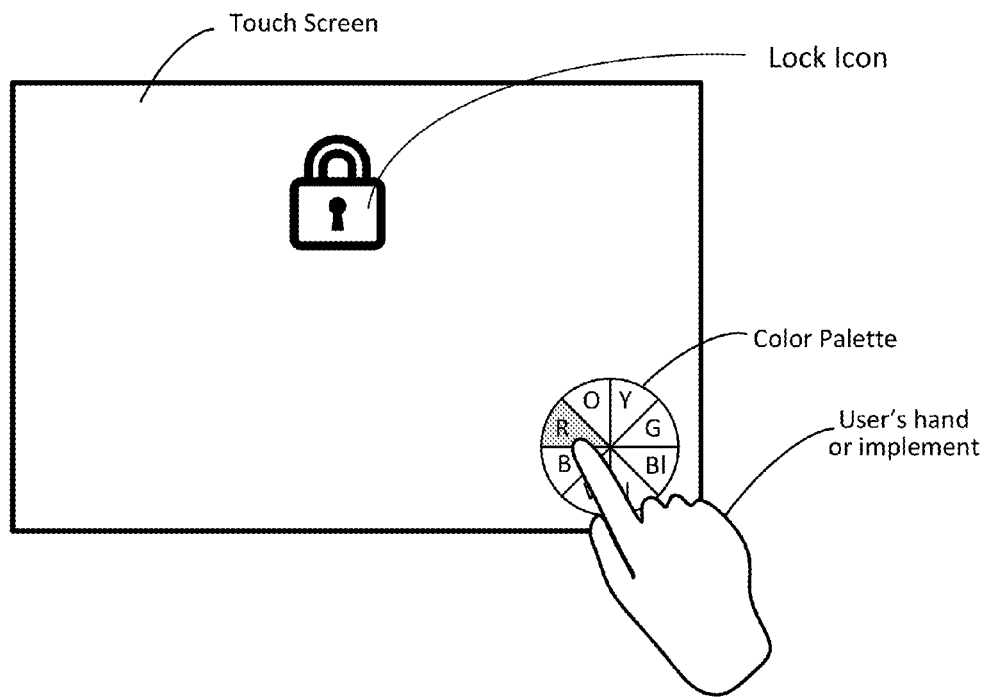
Figure 3C:
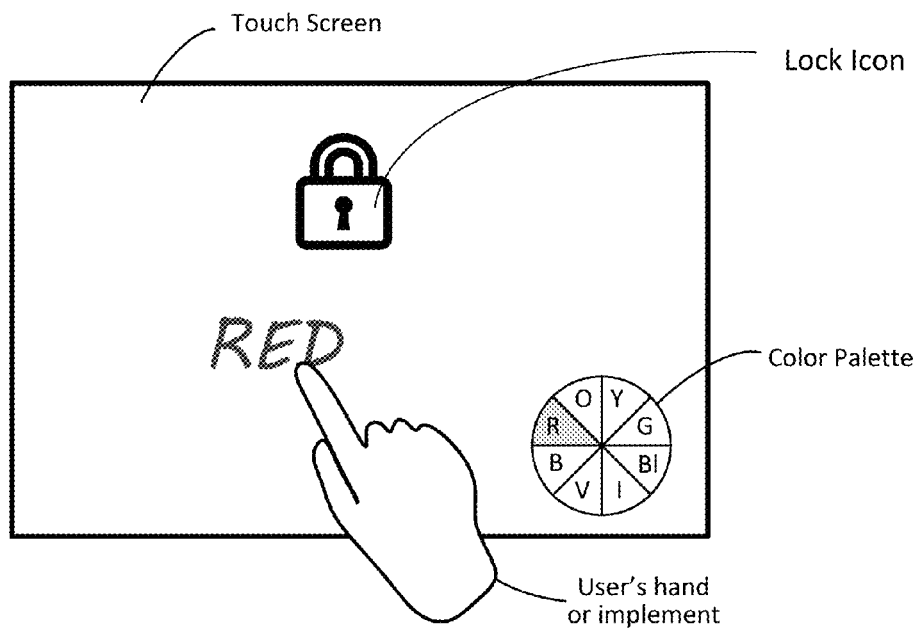
Figure 3D:
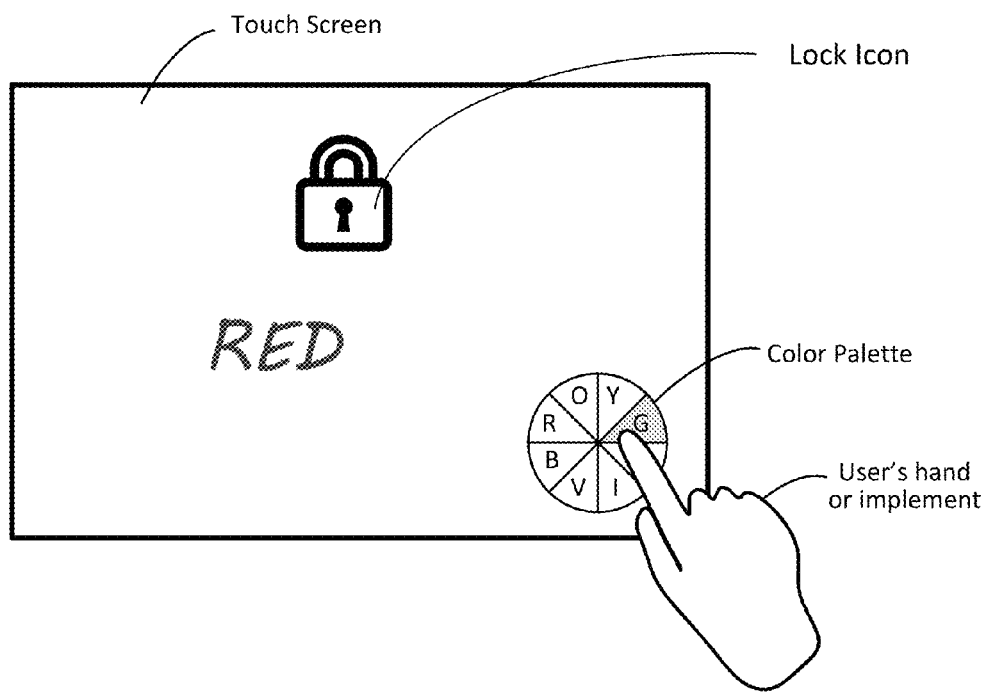
Figure 3E:
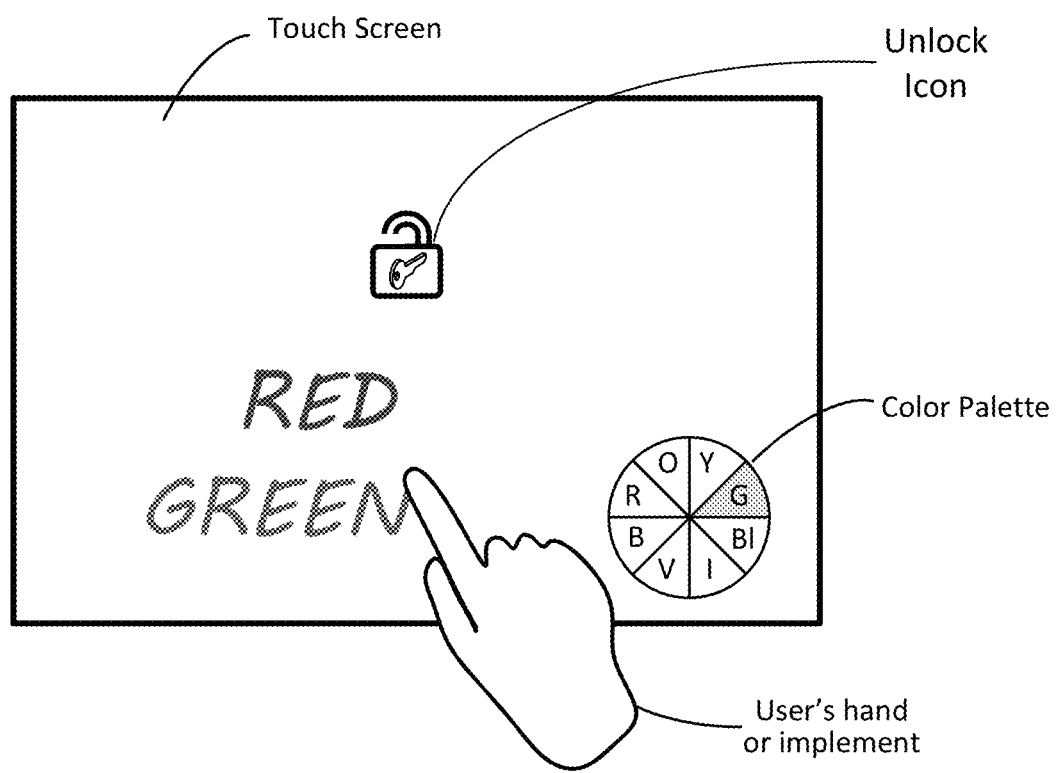

FIGS. 3a-e collectively illustrate an example pattern unlock mode that can be applied to a touch sensitive display of an electronic device, in accordance with an embodiment of the present invention. As can be seen in FIG. 3a, the touch screen of the device is displaying the unlock screen, which in this example includes a lock icon and a color palette. In this example, the password/color combination option is enabled, and the password is the words "red" and "green" written in the colors red and green respectively. The user can interact with the touch screen using a finger, active or passive stylus, or any other suitable implement. In the particular example shown in FIG. 3b, the user taps the appropriate area of the color palette to select the color red. As can be seen in FIG. 3c, once the color red is selected, the user may write the word "red" in the color red on the touch screen surface of the device. In some embodiments the device may designate a specific area of the unlock screen for writing text or doodles. After writing out the first portion of the password in the appropriate color, the user may select the green color from the color palette, as shown in FIG. 3d. Finally, the user may complete the password by writing the word "green" in the color green on the touch screen of the device. As shown in this particular example embodiment, once the password is properly written in the appropriate colors, the lock icon may change to an unlock icon, and the device may be unlocked. This is because the devices knows what colors have been used and can interpret the given doodle or password just as done in a notes application. In some embodiments, the unlocking function may be accompanied by a graphic or sound effect which may be user configurable or hard-coded. Note that although this example embodiment describes a pattern including colors combined with written text or doodles, an image pattern may also be included.

Figure 4A:
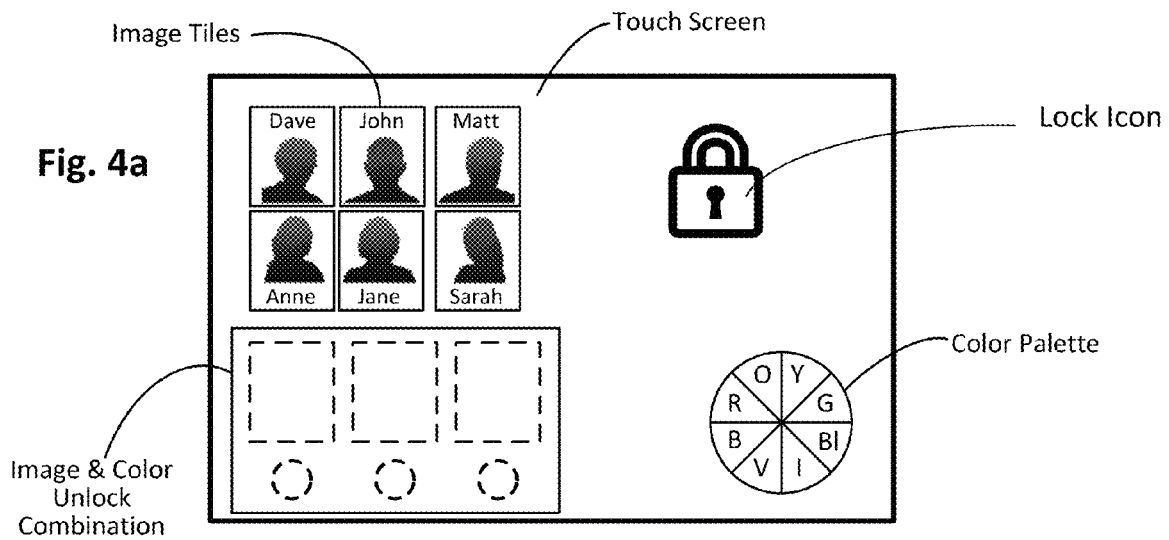
Figure 4B:
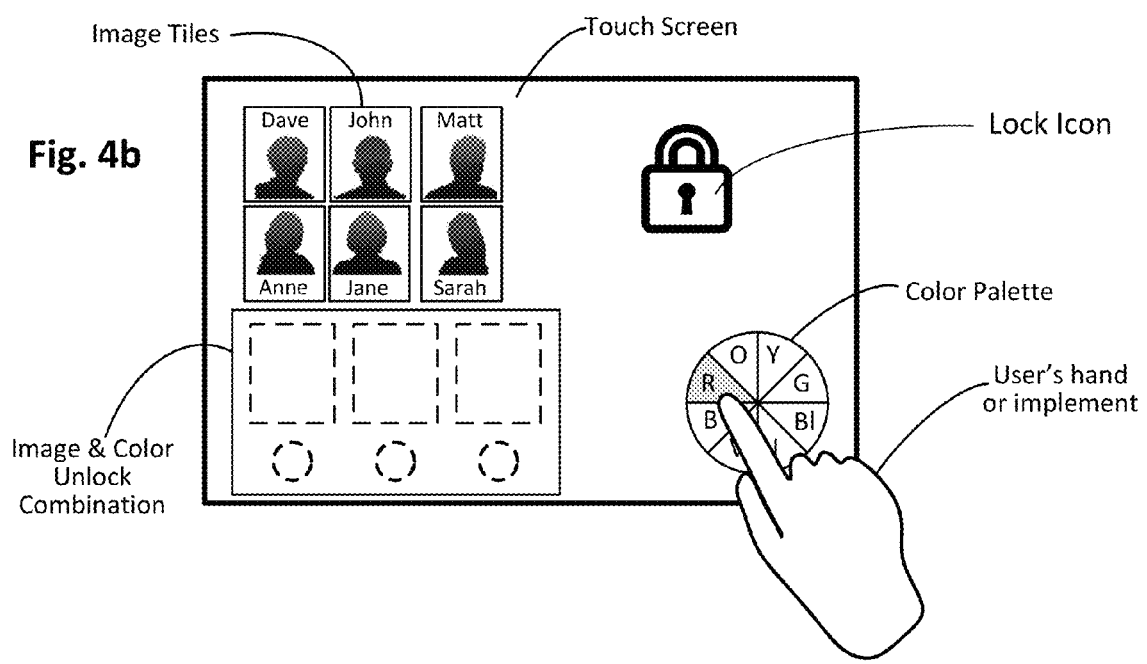
Figure 4E:
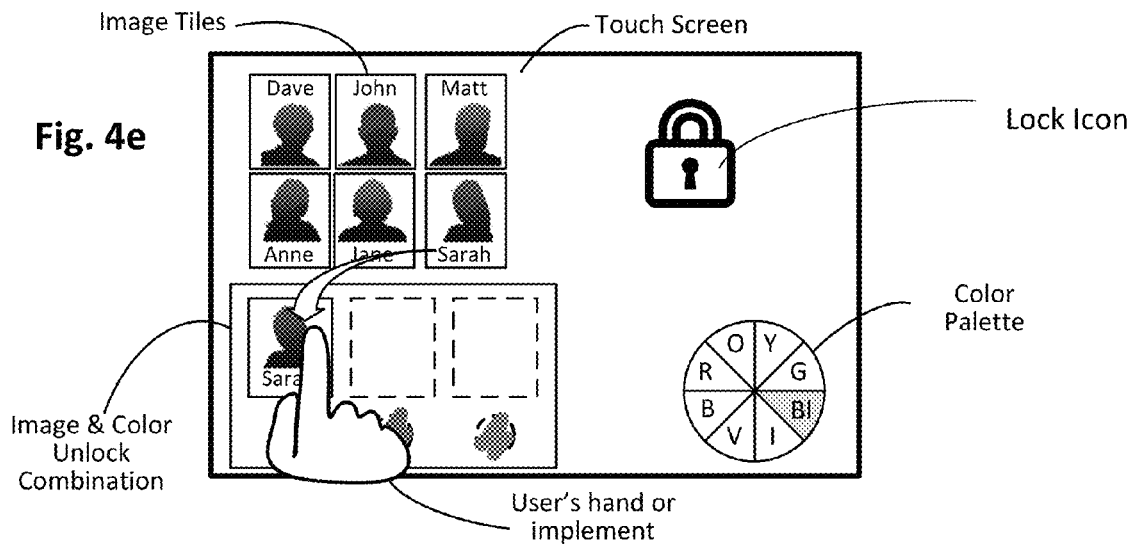
Figure 4F:
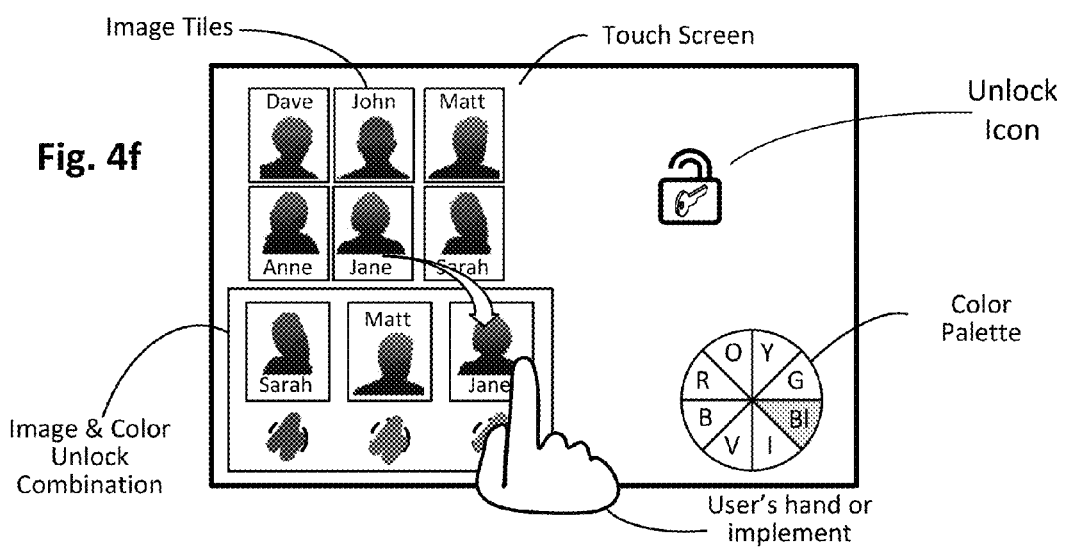

FIGS. 4a-g collectively illustrate an example image and color unlock mode that can be applied to a touch sensitive display of an electronic device, in accordance with another embodiment of the present invention. As can be seen in FIG. 4a, the touch screen of the device is displaying the unlock screen, which in this example includes a lock icon, a color palette, a selection of image tiles, and an image & color unlock combination area. In this particular example, six image tiles are displayed, while in other embodiments more or less image tiles may be displayed on the screen (e.g., 2×2 grid or 5×5 grid of images). In this example, the image and color unlock combination area includes spaces for three images to be arranged, and three circular color-input areas that the user must fill with the appropriate colors. In this particular example, the image and color combination option is enabled, and the proper unlocking combination is the image of Sarah matched with the color red, the image of Matt matched with the color green, and the image of Jane matched with the color blue. The user can interact with the touch screen using a finger, stylus, or other suitable implement. In the particular example shown in FIG. 4b, the user has tapped the appropriate area of the color palette to select the color red. As can be seen in FIG. 4c, once the color red is selected, the user may fill in the first color-input area with red ink. Similarly, the user may select the colors green and blue and fill in the second and third color-input areas respectively, as shown in FIG. 4d. In this example, the user may tap the appropriate image tiles and drag them to their corresponding areas on the unlock combination area. As shown in FIG. 4e, the user has tapped the image of Sarah and has dragged it to the first image area that is matched with the color red. Similarly, the user may complete the unlock combination by matching the image of Matt with the color green, and the image of Jane with the color blue, as shown in the example of FIG. 4f. In some embodiments, once the proper image and color combination has been matched, the lock icon may change into an unlock icon and the device may be unlocked.

Note that numerous alternative embodiments will be apparent in light of this disclosure. For instance, instead of dragging images into specific locations or filling in color input areas, the user might only tap the images or colors in a specific order. In one such example embodiment, the user may tap the pictures of Matt, Sarah, and Jane (in the correct order of 1, 2, and 3), then tap the colors red, green, and blue (in the correct order of 4, 5, and 6), thus unlocking the device. In another such example embodiment, the user may tap just one or more images from a set of images to unlock the device with no color tapping. Any number of image and/or color tapping sequences may be configured as the unlocking pattern, and the claimed invention is not intended to be limited to any specific order or sequence. The number of required matches may vary from 1 to many, depending on the desired degree of security, as will be appreciated in light of this disclosure.

In some embodiments, the various image tiles may be taken from images saved on the electronic device. In another example, the unlock combination may include images of the user's social media friends or contacts. In some such examples, the image tiles may include the photos of Facebook® friends, Linkedin® contacts, Tumblr® bloggers that the user follows, or Flickr® photos, just to name a few examples, as well as any avatars known to the user. As described above, the various image and color combinations may be configured by the user with one or more configuration sub-menus. In some embodiments, the unlocking function may be accompanied by a graphic or sound effect which may be user configurable or hard-coded.

Figure 4G:
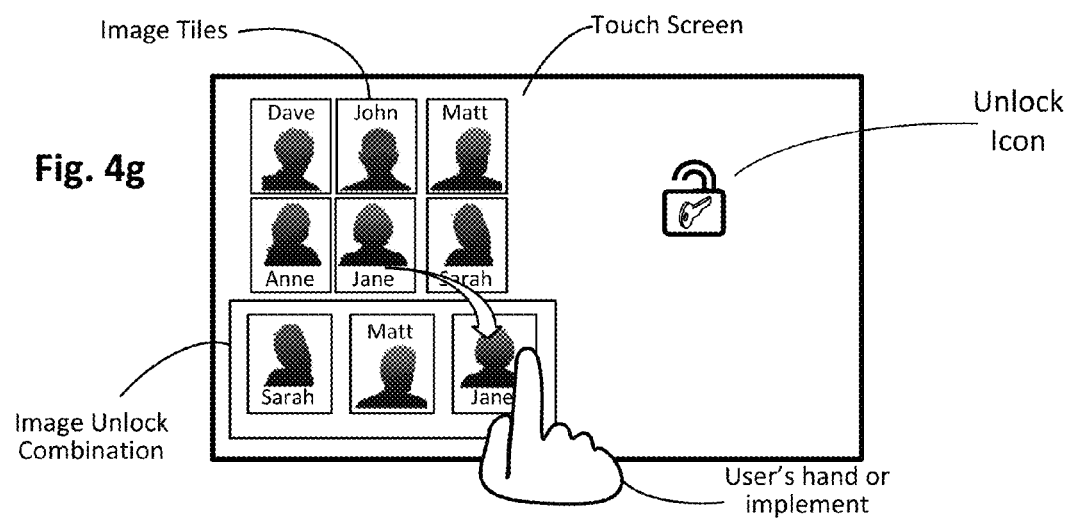

With further reference to FIG. 4g, an example embodiment of a completed lock screen is shown wherein the image only combination feature shown in FIG. 1d has been selected. In such an example embodiment, the unlocking mechanism is associated with an image pattern, and therefore the color palette does not appear on the unlock screen of the device and the optional color input areas are not present in the image unlock combination area. In this particular example, the image tiles include images gathered from the user's photo collection and/or one or more social media profiles as previously explained. As shown in the example of FIG. 4g, the unlocking combination includes the social media avatars of Sarah, Matt, and Jane who are each friends or contacts of the user. In such an embodiment, the user has unlocked the device by tapping and dragging the image tiles into the proper order. In another example, the user may unlock the device by tapping the images in the correct order. As described above, the image only unlocking combination may be configured by the user with one or more configuration sub-menus. In some embodiments, once the proper image combination has been arranged, the lock icon may change into an unlock icon and the device may be unlocked, as shown.

FIGS. 5a-d collectively illustrate an example image and color unlock mode that can be applied to a touch sensitive display of an electronic device, in accordance with another embodiment of the present invention. As can be seen in FIG. 5a, the touch screen of the device is displaying the unlock screen, which in this example includes a lock icon, a color palette, a randomly changing image, a color input area, and an image & color unlock combination area. In this example, the image and color unlock combination area includes spaces for three images matched with three color input areas. In this particular example, the image and color combination option is enabled, and the proper unlocking combination is the color blue matched with image 1, the color yellow matched with image 2, and the color red matched with image 3. The user can interact with the touch screen using a finger, stylus, or other suitable implement. In the particular example shown in FIG. 5b, the randomly changing image is currently showing image 1 and the user has tapped the appropriate area of the color palette to select the color blue. In this example case, the random image effectively acts as a trigger or hint to the user as to what color to select (e.g., based on an image-color pair previously established by the user, for instance, via a UI configuration page as previously explained). Coloring in the color input area with blue while image 1 is being displayed on the unlock screen fulfills one of the matches for the image and color unlock combination. In a similar way, the user may match the color yellow with image 2 by filling in the color input area while image 2 is being displayed, and match the color red with image 3 by filling in the color input area while image 3 is being displayed, as illustrated in the examples shown in FIGS. 5*c-d*. Each time the proper color is matched with an image, that match may be displayed in the image and color unlock combination area. In this particular example embodiment, the colors need not be matched with the randomly changing images in any particular order, while in other embodiments a specific matching order may be required in order to unlock the device. In this particular example, once the proper image and color matches have been completed, the image and color unlock combination area is completely filled, the lock icon may change into an unlock icon, and the device may be unlocked. As previously explained, the number of required matches may vary from 1 to many, depending on the desired degree of security, as will be appreciated in light of this disclosure.

In other embodiments, a user might assign a unique password, color, or doodle to each of a number of images, and each time the device's screen locks, the user is provided with just one of these images picked at random. In such an example, in order to unlock the device the user must draw the correct pattern, color, or color combination corresponding to the displayed image. In one such example embodiment, image A might be associated with a blue triangle, image B with a red circle, image C with a yellow square, and image D with a green circle and a violet circle. In such an example case, when the unlock screen is activated, one of these images is displayed and the user must draw the corresponding shape in order to unlock the device. For instance, if the user is shown image C on the unlock screen, only drawing a yellow square will successfully unlock the device. The device may be configured to allow a number of failed attempts before initiating a lock-mode security check where the user must now confirm she/he is in control of the device (e.g., by properly responding to a security check email sent by the device to a known account of the user or by answering a telephone call initiated by the device for a voice scan).

Methodology

Figure 6:
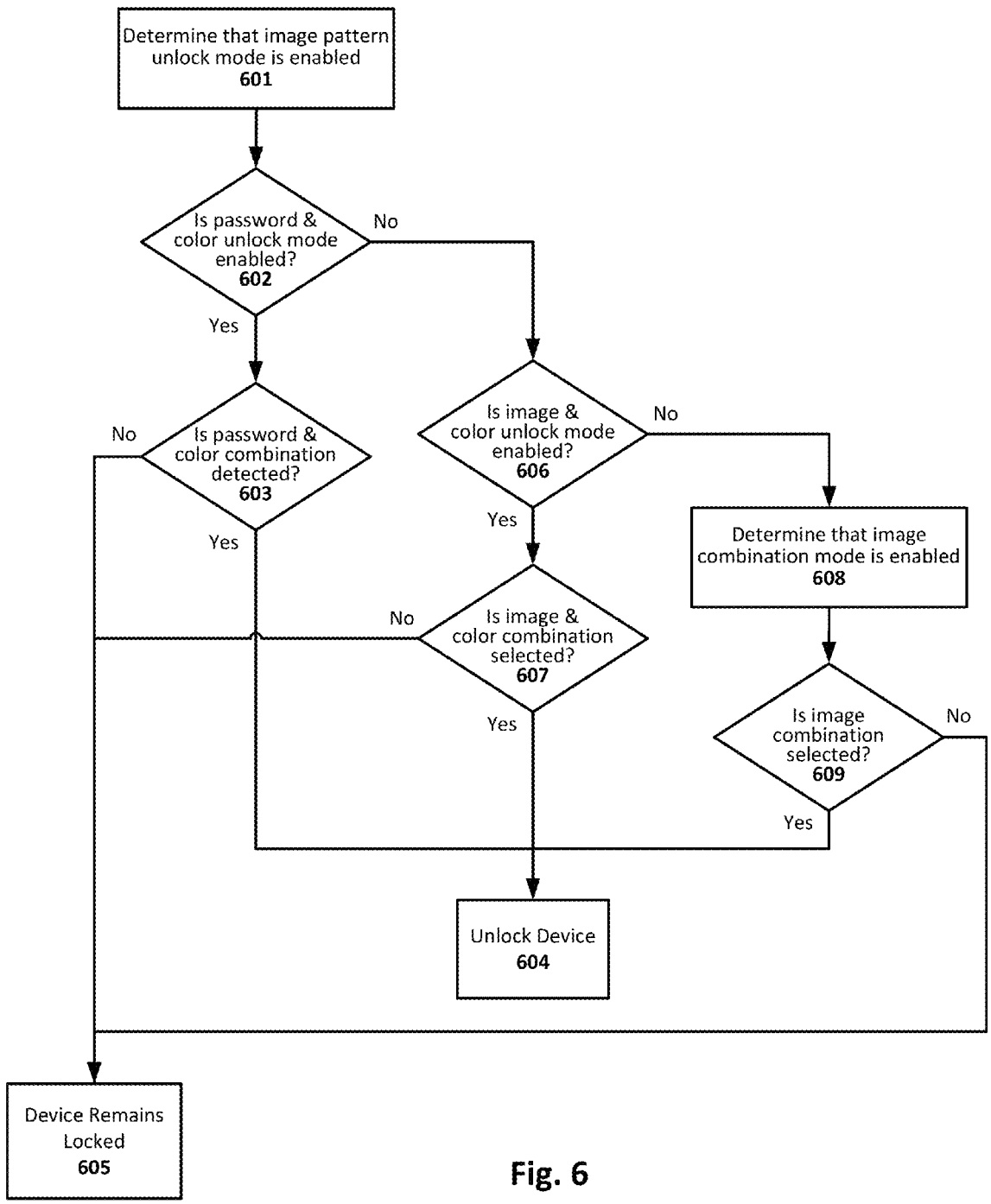
FIG. 6 illustrates a method for providing an image pattern unlock mode in an electronic touch screen device, in accordance with an embodiment of the present invention.

FIG. 6 illustrates a method for providing an image pattern unlock mode in an electronic touch sensitive screen device, in accordance with an embodiment of the present invention. This example methodology may be implemented, for instance, by the UI module of the example touch screen device shown in FIG. 2*a*, or the example touch screen device shown in FIG. 2*b* (e.g., with the UI provisioned to the client by the server). To this end, the UI can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including an image pattern unlock mode as variously described herein, as will be appreciated in light of this disclosure.

In this example case, the method includes determining 601 that the image pattern unlock mode is enabled. As previously explained, the image pattern unlock mode may be always enabled and/or configured from the factory in some embodiments, while other embodiments may be configured and/or enabled by the user. To this end, the determination at 601 ensures that the image pattern unlock mode is a possible option for the selected content. The method may continue with determining 602 whether the password and color unlock mode is enabled. The password and color unlock mode may be enabled, in some embodiments, to unlock the device if the proper word or words are written on the surface of the touch screen device in the proper colors. In one such embodiment, the unlock screen may include a color palette that allows the user to select a desired color, along with an input area where the user may write out the proper password or doodle to unlock the device. If the password and color unlock mode is enabled, the method may continue with determining 603 whether the proper password and color combination is detected. If the proper password or passwords are detected in the proper colors, the method may continue with unlocking 604 the device. If, however, the proper password and color combination are not detected, the device remains locked as indicated at 605.

If the password and color unlock mode is not enabled at 602, the method may continue with determining 606 whether the image and color unlock mode is enabled. The image and color unlock mode may be enabled, in some embodiments, to unlock the device only if the appropriate colors are matched with the proper images in the correct order. If the image and color unlock mode is enabled, the method may continue with determining 607 if the proper image and color combination is selected. If the user has selected the proper combination of images matched with the proper colors, the method may continue with unlocking 604 the device. If, however, the proper combination of images and matching colors is not selected, the device remains locked as indicated at 605.

If the image and color unlock mode is not enabled at 606, the method may continue with determining 608 that the image combination mode is enabled. In some embodiments, the image combination mode may be combined with an existing password or other unlock pattern, adding additional security to the unlock mode. In other embodiments, any unique image pattern may be configured to unlock the electronic device, such as a sub-set (one or more, but not all) of images selected from a displayed plurality of images, or a set of displayed images arranged in a specific order. The method may continue with determining 609 whether the proper image combination is selected. If the proper image combination is selected by the user, the method may continue with unlocking 604 the device. If the proper image combination is not selected by the user, the device remains locked as indicated at 605.

Numerous variations and configurations will be apparent in light of this disclosure. For example, one example embodiment provides a device including a touch screen display for displaying content to a user and allowing user input. The device also includes a user interface including an image pattern unlock mode configured to activate in response to the device entering a locked state, wherein the image pattern unlock mode is configured to unlock the device in response to a user selecting a predetermined image pattern. In some cases, the predetermined image pattern is user configurable.

In some cases, the predetermined image pattern includes a plurality of images, at least one of which is gathered from the user's photo collection. In some cases, the predetermined image pattern includes a plurality of images, at least one of which is associated with a social media profile, online networking service profile, or an online avatar. In some cases, the image pattern unlock mode is configured to display a plurality of images from which the user may select the predetermined image pattern, and the predetermined image pattern includes one or more of the plurality of images but not all the images in the plurality. In some cases, the predetermined image pattern includes a plurality of images arranged into a predetermined order. In some cases, the predetermined image pattern includes a plurality of images selected in a predetermined order. In some cases, the image pattern unlock mode is further configured to display an unlocking animation as the device is being unlocked. In some cases, the image pattern unlock mode is further configured to maintain the device in a locked state if the predetermined image pattern is not selected. In some cases, the device is an eReader device or a tablet computer or a smartphone.

Another example embodiment of the present invention provides a mobile computing system including a processor and a display for displaying content to a user and a touch sensitive surface for allowing user input. The system also includes a user interface executable on the processor and including an image pattern unlock mode, wherein the image pattern unlock mode is configured to maintain the device in a locked state until a predetermined image pattern is selected, wherein the predetermined image pattern is user configurable. In some cases, the predetermined image pattern includes a plurality of images selected or arranged in a predetermined order. In some cases, the image pattern unlock mode is configured to display a plurality of images from which the user may select the predetermined image pattern, and the predetermined image pattern includes one or more of the plurality of images but not all the images in the plurality. In some cases, the predetermined image pattern includes a plurality of images, at least one of which is associated with a social media profile, online networking service profile, or an online avatar.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to display on the electronic device an unlock screen, wherein the unlock screen prompts the user to input a unique image pattern. The process is also configured to unlock the electronic device in response to a user inputting the unique image pattern. In some cases, the unique image pattern is user configurable. In some cases, a user inputting the unique image pattern includes the user selecting or arranging a plurality of images in a predetermined order. In some cases, the image pattern unlock mode is configured to display a plurality of images from which the user may select the predetermined image pattern, and the predetermined image pattern includes one or more of the plurality of images but not all the images in the plurality. In some cases, the unique image pattern includes a plurality of images, at least one of which is associated with a social media profile, online networking service profile, or an online avatar. In some cases, the process is also configured to maintain the device in a locked state in response to a user inputting an incorrect image pattern.

The foregoing description of the embodiments of the invention has been presented for the purposes of illustration and description. It is not intended to be exhaustive or to limit the invention to the precise form disclosed. Many modifications and variations are possible in light of this disclosure. For example, while the unlock techniques described herein are provided in the context of touch sensitive devices, they could also be used with any computing system (e.g., desktops, laptops, etc.) where the user can provide color and/or image selection using other user input mechanisms such as mouse and keyboard. It is intended that the scope of the invention be limited not by this detailed description, but rather by the claims appended hereto.

What is claimed is:

1. A device, comprising:
a touch screen display for displaying content to a user and allowing user input; and
a user interface including an image pattern unlock mode configured to activate in response to the device entering a locked state thereby causing an unlock screen to display, wherein the image pattern unlock mode is further configured to display a random image on the unlock screen, and unlock the device in response to receiving an unlock code including a correct unlock screen input that corresponds to the random image, wherein the combination of the random image and the correct unlock screen input is pre-established and provides at least part of the unlock code.

2. The device of claim 1 wherein the correct unlock screen input comprises a color that is selected from a palette of colors displayed on the unlock screen.

3. The device of claim 1 wherein the image pattern unlock mode is further configured to display a plurality of random images, at least one of which is gathered from a user's photo collection and each random image is associated with a corresponding correct unlock screen input so as to provide a plurality of pre-established image-input pairs.

4. The device of claim 1 wherein the image pattern unlock mode is further configured to display a plurality of random images, at least one of which is associated with a social media profile, online networking service profile, or an online avatar, and each random image is associated with a corresponding correct unlock screen input so as to provide a plurality of pre-established image-input pairs.

5. The device of claim 1, wherein the correct unlock screen input comprises a doodle input via the touch screen display.

6. The device of claim 1 wherein the correct unlock screen input comprises a password input via the touch screen display.

7. The device of claim 1 wherein a plurality of random images are presented for display on the unlock screen, each random image associated with a correct unlock screen input, such that the unlock code includes a plurality image-input pairs.

8. The device of claim 1 wherein the image pattern unlock mode is further configured to display an unlocking animation as the device is being unlocked.

9. The device of claim 1 wherein the image pattern unlock mode is further configured to display a plurality of random images one at a time, and each random image is associated with a corresponding correct unlock screen input so as to provide a plurality of pre-established image-input pairs.

10. The device of claim 1 wherein the device is an eReader device or a tablet computer or a smartphone.

11. A mobile computing system, comprising:
a processor and a display for displaying content to a user and a touch sensitive surface for allowing user input; and
a user interface executable on the processor and including an image pattern unlock mode, wherein the image pattern unlock mode is configured to display a random image on an unlock screen and maintain the mobile computing device in a locked state until receiving an unlock code including a correct unlock screen input that corresponds to the random image, wherein the combination of the random image and the correct unlock screen input is pre-established and provides at least part of the unlock code.

12. The system of claim 11 wherein the correct unlock screen input comprises a color that is selected from a palette of colors displayed on the unlock screen.

13. The system of claim 11 wherein the and correct unlock screen input comprises a doodle input via the touch screen display.

14. The system of claim 11 wherein the image pattern unlock mode is further configured to display a plurality of random images, at least one of which is associated with a social media profile, online networking service profile, or an online avatar, and each random image is associated with a corresponding correct unlock screen input so as to provide a plurality of pre-established image-input pairs.

15. A non-transient computer program product comprising a plurality of instructions encoded thereon that when executed by one or more processors cause a process to be carried out, the process comprising:
display on the electronic device an unlock screen, wherein the unlock screen is configured to display a random image and prompt a user to input an unlock code; and
unlock the electronic device in response to receiving the unlock code, the unlock code including a correct unlock screen input that corresponds to the random image, wherein the combination of the random image and the correct unlock screen input is pre-established and provides at least part of the unlock code.

16. The computer program product of claim 15 wherein the correct unlock screen input comprises a color that is selected from a palette of colors displayed on the unlock screen.

17. The computer program product of claim 15 wherein the correct unlock screen input comprises a doodle input via the touch screen display.

18. The computer program product of claim 15 wherein a plurality of random images is displayed on the unlock screen, and each random image is associated with a corresponding correct unlock screen input so as to provide a plurality of pre-established image-input pairs.

19. The computer program product of claim 15 wherein the random image is associated with a social media profile, online networking service profile, or an online avatar.

20. The computer program product of claim 15 wherein the process further comprises: display a plurality of random images one at a time, and each random image is associated with a corresponding correct unlock screen input so as to provide a plurality of pre-established image-input pairs.

* * * * *